(12) United States Patent
Krietsch et al.

(10) Patent No.: US 8,039,094 B2
(45) Date of Patent: Oct. 18, 2011

(54) MACHINE-READABLE SECURITY ELEMENT FOR SECURITY PRODUCTS

(75) Inventors: Burkhard Krietsch, Dieburg (DE); Matthias Kuntz, Seeheim-Jugenheim (DE); Oliver Muth, Berlin (DE); Manfred Paeschke, Basdorf (DE); Jakob Kuen, Berlin (DE)

(73) Assignees: Merck Patent GmbH, Darmstadt (DE); Bundesdruckerei GmbH, Berlin (DE)

( * ) Notice: Subject to any disclaimer, the term of this patent is extended or adjusted under 35 U.S.C. 154(b) by 630 days.

(21) Appl. No.: 11/597,377

(22) PCT Filed: Apr. 29, 2005

(86) PCT No.: PCT/EP2005/004603
§ 371 (c)(1),
(2), (4) Date: Oct. 9, 2008

(87) PCT Pub. No.: WO2005/115766
PCT Pub. Date: Dec. 8, 2005

(65) Prior Publication Data
US 2010/0024681 A1 Feb. 4, 2010

(30) Foreign Application Priority Data
May 24, 2004 (DE) .......................... 10 2004 025 373

(51) Int. Cl.
*B41M 5/00* (2006.01)
(52) U.S. Cl. ...................... 428/195.1; 428/206; 428/324; 428/328; 428/330; 428/690; 428/917; 283/92
(58) Field of Classification Search ............... 428/195.1, 428/208, 403, 404, 206, 324, 328, 330, 690, 428/917; 283/83, 92
See application file for complete search history.

(56) References Cited

U.S. PATENT DOCUMENTS

| | | | | |
|---|---|---|---|---|
| 3,376,453 A * | 4/1968 | Leach | ............................ | 313/509 |
| 4,568,609 A * | 2/1986 | Sato et al. | ...................... | 428/403 |
| 5,059,245 A * | 10/1991 | Phillips et al. | ............. | 106/31.65 |
| 5,360,628 A * | 11/1994 | Butland | ............................ | 427/7 |
| 5,472,640 A * | 12/1995 | Bruckner et al. | ......... | 428/402.24 |
| 5,777,960 A | 7/1998 | Ohno et al. | | |
| 6,155,605 A * | 12/2000 | Bratchley et al. | ................ | 283/72 |
| 6,346,973 B1 * | 2/2002 | Shibamoto et al. | .............. | 349/69 |
| 6,530,527 B1 | 3/2003 | Ahlers | | |
| 6,562,460 B1 * | 5/2003 | Bayless | ...................... | 428/402.24 |
| 6,630,018 B2 * | 10/2003 | Bauer et al. | .................... | 106/415 |
| 7,040,663 B1 | 5/2006 | Plaschka et al. | | |
| 7,427,029 B2 * | 9/2008 | Bailleu et al. | .................. | 235/487 |

FOREIGN PATENT DOCUMENTS

| | | |
|---|---|---|
| CA | 2 300 971 | 2/2000 |
| DE | 41 26 051 | 2/1993 |
| DE | 19708543 A1 | 9/1998 |
| DE | 199 07 697 A1 | 8/2000 |
| DE | 197 35 293 C2 | 6/2003 |
| EP | 1 156 934 A0 | 2/2000 |
| EP | 1 359 792 A | 11/2003 |
| GB | 2258426 A | 2/1993 |
| WO | WO 00/50249 | 8/2000 |
| WO | WO 2004/108426 A | 12/2004 |

OTHER PUBLICATIONS

McGraw-Hill Dictionary of Scientific and Technical Terms, Fourth Edition, (1989).

* cited by examiner

*Primary Examiner* — Gerard Higgins
(74) *Attorney, Agent, or Firm* — Millen, White, Zelano & Branigan, P.C.

(57) ABSTRACT

The invention relates to a machine-readable security element for security products, containing at least one particulate substance that has electroluminescent properties and a transparent, electrically conductive pigment. Also disclosed are a printing ink for producing such a security element and a security product comprising said security element.

26 Claims, No Drawings

MACHINE-READABLE SECURITY ELEMENT FOR SECURITY PRODUCTS

The present invention relates to a machine-readable security element for security products which emits visible and machine-detectable radiation after contactless excitation in an electric alternating field, to a printing ink for the production of a security element of this type, and to security products which include a security element of this type.

Security products, such as banknotes, cheques, credit cards, shares, passports, identity documents, driving licences, entry tickets, value stamps and the like, have for many years been provided with various security features which are intended to make counterfeiting of these products more difficult.

Security products are preferably provided with various security elements which belong to different security levels. It is of major advantage here if one and the same security element simultaneously belongs to a plurality of security levels, i.e. if a limited area of a security product can be verified both optically without aids and also with aids, the perceptible optical impression generally being different. It is particularly desirable for a security element of this type which has different security levels to be produced in a simple, preferably single, process step.

These security elements include those which comprise substances having electroluminescent properties. These are taken to mean substances which emit visible radiation due to excitation in an electric alternating field.

In order to be able to detect a security element of this type, the security product must be excited using an electric alternating field.

Security elements which comprise substances having electroluminescent properties are known.

Thus, DE 41 26 051 describes a security document having an embedded security thread which has electroluminescent properties. This security thread has a multilayered structure and contains a layer comprising an electroluminescent substance between two electrically conductive layers which act as electrodes.

Light emission can only be detected in the case of this particular structure and with direct electrical contacting of the electrodes.

DE 197 35 293 discloses a value and security product having a luminescent element. The luminescent element is located in a layer of the security product which is arranged below a layer having an authenticity feature. It thus serves as backlighting for the overlying authenticity element.

The design of the authenticity element is of secondary importance here. In addition, it does not necessarily have to be optically visible without aids. A laser-capable polycarbonate film is described as authenticity element. The electroluminescent element is produced by printed-on electrodes and substances having electroluminescent properties located in a separate layer.

This structure is very complicated and likewise only allows contact-encumbered production of the electroluminescence.

A value and security product having a similar structure is described in DE 197 08 543. The electroluminescent substances here, which are printed on, are arranged in such a way that the field lines of the electric alternating field which are generated by the planar electrode arrangement pass through them. Here too, contactless production of the electroluminescence is not possible.

EP 1 156 934 B1 discloses a document of value which contains at least one optically variable material and at least one machine-readable feature material, where the feature material is in the form of a code or alphanumeric information, and the optically variable material is a pigment. The machine-readable feature material here must not impair the visible, optically variable effect of the optically variable material. The machine-readable feature material can be, inter alia, a luminescent substance, an electrically conductive polymer, carbon black or the like. These are generally employed alternatively.

The luminescent substances described are those which emit light outside the visual spectral region. Substances having electroluminescent properties are not mentioned.

The electrically conductive polymer or the carbon black is employed for the production of electrically conductive layers.

The machine-readable feature material can either be located in the same layer as the optically variable material or alternatively in a separate layer. Although two different security levels are advantageously combined with one another in this document of value, the machine-readable feature is a feature which can be detected under IR or UV light and cannot be machine-read using special checking equipment which produces an electric alternating current field. However, this equipment is principally employed in professional checking equipment for documents of value, such as, for example, automatic banknote counters and checkers.

The object of the present invention was therefore to provide a machine-readable, electroluminescent security element for security products which has luminescence which can be evaluated by machine on contactless excitation in an electric alternating field, has a simple structure, is preferably transparent, can be applied to a security product by means of a simple process and into which a further security level can be integrated in a simple manner.

A further object was to provide a printing ink for the production of a security element of this type.

Furthermore, an additional object of the present invention was to provide a pigment mixture which can be employed for a printing ink for the production of a security element having the above-mentioned properties.

Finally, a further object of the present invention was to provide a security product which includes a security element which has high electroluminescence intensity on contactless excitation by an electric alternating field.

The object according to the invention is achieved by a machine-readable security element for security products which comprises at least one particulate substance having electroluminescent properties and a transparent, electrically conductive pigment.

The object according to the invention is furthermore achieved by a printing ink for the production of a security element which comprises at least one particulate substance having electroluminescent properties and a transparent, electrically conductive pigment.

The object according to the invention is in addition achieved by a security product which comprises a single- or multilayered support material and at least one machine-readable security element having the above-described composition arranged on or within a layer of the support material.

For the purposes of the invention, security products are taken to mean documents of value, such as banknotes, cheques, credit cards, shares, passports, identity documents, driving licences, entry tickets, value stamps, labels, packaging materials, seals and the like, but likewise articles of daily use to be safeguarded, such as, for example, clothing, shoes, household articles, consumer electronic articles and the like, where the security element according to the invention is applied directly to the article.

The security element according to the invention comprises at least one particulate substance having electroluminescent properties and a transparent, electrically conductive pigment.

The substances having electroluminescent properties are generally particulate materials which comprise inorganic compounds from groups II and VI of the Periodic Table, for example ZnS or CdS, which have been doped or activated with metals, such as Cu, Mn or Ag. It is likewise possible to employ particulate luminescent substances based on silicates, aluminates, phosphates, tungstates, germanates, borates, etc., which have predominantly been activated using Mn, Sr or using rare earths, in particular substances based on $Zn_2SiO_4$: Mn, or also particulate organic polymers, or mixtures of the above-mentioned compounds.

After excitation in an electric alternating field, these substances emit visible radiation. The emission of visible light preferably takes place alone or predominantly through excitation in an electric alternating field and to a lesser extent also through excitation in the ultraviolet or infrared spectral region.

The particles are advantageously in the form of microencapsulated compounds. Highly suitable materials for the encapsulating layer are, in particular, polymers or also various metal oxides. These protect the electroluminescent substances against various environmental influences, for example against the wet components of the printing ink, which can cause decomposition of the electroluminescent substances on long-term exposure. In addition, the ageing resistance of the electroluminescent substances can be increased or their light emission modified by filter layers.

The particle size of the particles is selected in such a way that they are suitable for printing processing and in particular for gravure printing. Average particle sizes which are suitable for this purpose are preferably in the range from about 0.2 to about 100 μm, preferably from 1 to 50 μm and particularly preferably from 2 to 30 μm.

In order to ensure that excitation of the luminescence does not occur in the ultraviolet spectral region, UV filter layers may additionally be applied to the surface of the electroluminescent particles.

It is also possible to add inorganic or organic dyes to the particulate electroluminescent substances so that the reflection bands or absorption bands of these substances shift. It is thus possible significantly to broaden the range of available hues for light emission, since the originally usable base materials only emit a small number of hues.

The particulate electroluminescent substances are employed individually or in a mixture of two or more different substances. If different substances are employed, it is advantageous for these to emit radiation of different colours.

The transparent, electrically conductive pigments employed are pigments which have at least one transparent, electrically conductive layer.

Preference is given to the use of pigments which have at least one transparent, electrically conductive layer on a substrate selected from the group consisting of $TiO_2$, synthetic or natural mica, other phyllosilicates, glass, $SiO_2$ and/or $Al_2O_3$.

It is particularly preferred here for the said substrates to be in flake form. In principle, however, the use of pigments which have at least one transparent, electrically conductive layer on a non-flake-form substrate comprising the above-mentioned materials is also suitable. Transparent pigments which consist of an electrically conductive material are likewise suitable. It is particularly advantageous for the electrically conductive pigments to have smoothly rounded-off shapes without corners, sharp edges or projecting points, both in cross section and also in the longitudinal axis. The use of the non-flake-form pigments is restricted merely by the applicational properties in the security element according to the invention.

In general, the electrically conductive layer or the electrically conductive material comprises one or more conductive, doped metal oxides, such as, for example, tin oxide, zinc oxide, indium oxide or titanium oxide, which have been doped with gallium, aluminium, indium, thallium, germanium, tin, phosphorus, arsenic, antimony, selenium, tellurium and/or fluorine.

The above-mentioned transparent conductive pigments may, if a substrate is present, have one or more further layers above and/or below the conductive layer. These layers can comprise metal oxides, metal oxide hydrates, metal suboxides, metal fluorides, metal nitrides, metal oxynitrides or mixtures of these materials.

The application of these additional layers allows the colour properties of the pigments to be matched to the users requirements, in particular if the additional layers are located below the conductive layer. The application of additional layers above the conductive layer enables the conductivity to be matched specifically to the application's requirements.

It has been observed that it is, for example, entirely advantageous for a dielectric layer to be located above the conductive layer, this dielectric layer preventing direct contact of the conductive layers in the case of mutual contact of conductive pigments in the security element according to the invention.

A particularly preferred material for a transparent, electrically conductive pigment is a mica coated with at least one electrically conductive metal-oxide layer. Particular preference is given here to a mica pigment coated with a layer of antimony-doped tin oxide, a mica pigment coated with a titanium-oxide layer, a silicon-oxide layer and an antimony-doped tin-oxide layer, or a mica pigment coated with an antimony-doped tin-oxide layer and a further metal-oxide layer, in particular a titanium-oxide layer.

Such pigments are commercially available from Merck KGaA under the name Minatec®.

The transparent, electrically conductive pigment in the security element according to the invention must have adequately high transparency at the same time as high electrical conductivity. For this reason, it is necessary for the particle diameter of the pigment to be in a range from 1 to 500 μm, preferably from 2 to 100 μm and particularly preferably from 5 to 70 μm. A narrow particle-size distribution is preferred.

The aspect ratio, i.e. the ratio of the average diameter to the average thickness of the pigments, in the case of flake-form conductive pigments is at least 2:1, but preferably at least 10:1 and particularly preferably at least 100:1.

Electrically conductive flake-form pigments which have proven to be particularly transparent while having high conductivity are those of the composition described above whose number-weighted mean particle area $F_{50}$ is greater than or equal to 150 μm², in particular greater than or equal to 200 μm². These have even more advantageous properties if the number-weighted proportion of pigments having a particle area of less than 80 μm² is less than or equal to 33% and preferably less than 25%, based on the transparent conductive pigments. However, still better transparency is obtained if the number-weighted proportion of pigments having a particle area of less than 40 μm² is less than or equal to 15% and preferably less than or equal to 10%, based on the transparent conductive pigments. The reduction in the fines contents results in a reduction in light scattering and thus in the haze in the security element according to the invention.

The particle area is taken to mean the value for the size of the principal surface of the flakes, namely the surface having the longest axis.

The fines content is monitored, for example, by measurement under the microscope and counting the measured particles. This can be carried out visually, if desired simplified by comparisons of the samples against counted standards, or automatically with the aid of a video camera and suitable automatic image-analysis software. Automatic analysis systems of this type for particle-size analysis are known to the person skilled in the art and are commercially available. For statistically guaranteed particle-size analysis, at least 1000 and preferably 2000 particles or more should be measured.

The transparent, electrically conductive pigment can be employed in the security element according to the invention individually or as a mixture of two or more different pigments. The variety here can consist both in the use of pigments comprising different materials, having different shapes and/or having different colours. Only the optical transparency of the material must be ensured.

In order to achieve good machine-readability with sufficiently high electroluminescence intensity, it is essential that the security element of the present invention comprises both substances having electroluminescent properties and also transparent, electrically conductive pigments, since the presence of the latter causes an increase in the electroluminescence intensity of the former and thus generates machine-readability.

If the security element according to the invention is to have a further security level in addition to the machine-readable electroluminescence, it may additionally also comprise at least one flake-form effect pigment and/or an organic or inorganic coloured pigment.

Flake-form effect pigments are taken to mean flake-form pearlescent pigments, predominantly transparent or semi-transparent interference pigments and metal-effect pigments. Liquid-crystal pigments, so-called LCPs, or structured polymer flakes, so-called holographic pigments, are also counted amongst these. These flake-form pigments are built up from one or more layers of materials, which may be different if desired.

Pearlescent pigments consist of transparent flakes of high refractive index and exhibit a characteristic pearlescence on parallel alignment due to multiple reflection. Pearlescent pigments of this type which additionally also exhibit interference colours are known as interference pigments.

Although classical pearlescent pigments, such as $TiO_2$ flakes, basic lead carbonate, BiOCl pigments or nacreous pigments, are of course in principle also suitable, the flake-form effect pigments preferably employed for the purposes of the invention are interference pigments or metal-effect pigments which have at least one coating of a metal, metal oxide, metal oxide hydrate or mixtures thereof, a metal mixed oxide, metal suboxide, metal oxynitride, metal fluoride, BiOCl or a polymer on an inorganic flake-form support. The metal-effect pigments preferably have at least one metal layer. The inorganic flake-form support preferably consists of natural or synthetic mica, kaolin or other phyllosilicates, of glass, $SiO_2$, $TiO_2$, $Al_2O_3$, $Fe_2O_3$, polymer flakes, graphite flakes or of metal flakes, such as, for example, of aluminium, titanium, bronze, silver, copper, gold, steel or various metal alloys. Particular preference is given to supports of mica, glass, graphite, $SiO_2$, $TiO_2$ and $Al_2O_3$ or mixtures thereof.

The size of these substrates is not crucial per se. The substrates generally have a thickness of between 0.01 and 5 µm, in particular between 0.05 and 4.5 µm. The extension in the length or width is usually between 1 and 250 µm, preferably between 2 and 200 µm and in particular between 2 and 100 µm. They generally have an aspect ratio (ratio of the average diameter to the average particle thickness) of 2:1 to 25,000:1 and in particular 3:1 to 2000:1.

A coating applied to the support preferably consists of metals, metal oxides, metal mixed oxides, metal suboxides or metal fluorides and in particular of a colourless or coloured metal oxide selected from $TiO_2$, titanium suboxides, titanium oxynitrides, $Fe_2O_3$, $Fe_3O_4$, $SnO_2$, $Sb_2O_3$, $SiO_2$, $Al_2O_3$, $ZrO_2$, $B_2O_3$, $Cr_2O_3$, ZnO, CuO, NiO or mixtures thereof.

Coatings of metals preferably comprise aluminium, titanium, chromium, nickel, silver, zinc, molybdenum, tantalum, tungsten, palladium, copper, gold, platinum or alloys thereof.

The metal fluoride employed is preferably $MgF_2$.

The flake-form effect pigments employed are particularly preferably multilayered effect pigments. These have a plurality of layers, which preferably consist of the above-mentioned materials and have various refractive indices in such a way that in each case at least two layers of different refractive index alternate on the support, on a flake-form, preferably non-metallic support, where the refractive indices in the individual layers differ by at least 0.1 and preferably by at least 0.3. The layers located on the support can be either virtually transparent or coloured or semitransparent.

The so-called LCPs, which consist of crosslinked, aligned, cholesteric liquid crystals, or alternatively structured polymer flakes known as holographic pigments, can likewise be employed as flake-form effect pigments.

The flake-form effect pigments described above may be present individually or in a mixture in the security element in accordance with the present invention.

The flake-form effect pigments employed in accordance with the invention are preferably transparent or semitransparent, i.e. they transmit at least 10% of the incident light. Flake-form effect pigments of this type are preferably used since their transparency contributes to a wide variety of possible background colours in a security product which has a security element in accordance with the present invention and at the same time the intensity of the light emission generated by electroluminescence is not impaired.

In certain embodiments of the present invention, however, it is advantageous if a flake-form effect pigment which has at least one metal layer is employed.

In a particularly preferred embodiment of the present invention, use is made of a flake-form effect pigment which leaves behind a different visually perceptible colour and/or brightness impression at different illumination and/or viewing angles. In the case of different colour impressions, this property is known as colour flop. In particular, pigments which have a colour flop produce uncopyable colour and gloss impressions which are readily perceptible with the naked eye without aids in the security elements produced therewith. Such pigments are also known as optically variable.

The optically variable flake-form effect pigments in accordance with the invention preferably have at least two and at most four optically clearly distinguishable discrete colours at least two different illumination or viewing angles, but preferably have two optically clearly distinguishable discrete colours at two different illumination or viewing angles or three optically clearly distinguishable discrete colours at three different illumination or viewing angles. In each case, only the discrete hues and not intermediate hues are preferably present, i.e. a clear change from one colour to another colour is evident on tilting the security element which comprises the optically variable pigments. This property on the one hand makes it easier for the viewer to recognise the security element as such and at the same time makes copying of this feature more difficult since colour-flop effects cannot be copied and reproduced in commercially available colour photocopiers.

However, it is of course also possible to employ optically variable flake-form effect pigments which have a colour progression, i.e. many different hues, such as, for example, the typical pearlescence, on tilting via different illumination and/or viewing angles. Diffuse colour changes of this type are also readily detectable by the human eye.

In order to be able to develop their full optical effect, it is advantageous if the flake-form effect pigments employed in accordance with the invention are in aligned form in the security element comprising them, i.e. they are aligned virtually parallel to the security-product surfaces provided with the security element. An alignment of this type generally already essentially takes place by means of the processes usually used for application of the security element, such as, for example, conventional printing processes.

Flake-form effect pigments that can be employed are, for example, the commercially available interference pigments available under the names Iriodin®, Colorstream®, Xirallic®, Lustrepak®, Colorcrypt®, Colorcode® and Securalic® from Merck KGaA, Mearlin® from Mearl, metal-effect pigments from Eckhard and goniochromatic (optically variable) effect pigments, such as, for example, Variochrom® from BASF, Chromafflair® from Flex Products Inc., Helicone® from Wacker or holographic pigments from Spectratec, and other commercially available pigments of the same type. However, this list should merely be regarded as illustrative and not restrictive.

Suitable inorganic coloured pigments are all customary transparent and opaque white, coloured and black pigments, such as, for example, Berlin Blue, bismuth vanadate, goethite, magnetite, haematite, chromium oxide, chromium hydroxide, cobalt aluminate, ultramarine, chromium/iron mixed oxides, spinels, such as Thenard's Blue, cadmium sulfides and selenides, chromate pigments or carbon black, while organic coloured pigments which may be mentioned are, in particular, quinacridones, benzimidazoles, copper phthalocyanine, azo pigments, perinones, anthanthrones, further phthalocyanines, anthraquinones, indigo, thioindigo and derivatives thereof, or Carmine Red. In general, all organic or inorganic coloured pigments, in particular those which are customary in the printing sector, can be employed.

For screening against ultraviolet radiation, it is also possible to employ pigments which absorb UV light. Of these, titanium dioxide and zinc oxide may be mentioned merely by way of example.

The particle size of the inorganic and organic coloured pigments is not limited, but must be matched to the requirements of the application of the security element on or in a security product, for example by means of a printing process.

The security element according to the invention is applied over the entire surface or to part of a security product.

In the simplest variant, this is carried out with the aid of a printing ink in a standard printing process.

Accordingly, the present invention also relates to a printing ink for the production of a security element which comprises at least one particulate substance having electroluminescent properties and a transparent, electrically conductive pigment.

Suitable as particulate substance having electroluminescent properties and as transparent, electrically conductive pigments are the materials already described above.

The said pigments and particles are present in the printing ink according to the invention in a suitable concentration such that printing of the ink is still possible without problems. Thus, the concentration of the particulate substance having electroluminescent properties in the printing ink is about 0.01 to 20% by weight, preferably 1 to 10% by weight and particularly preferably 2 to 8% by weight, based on the printing ink. By contrast, the transparent, electrically conductive pigment is generally present in the printing ink in a concentration of about 0.01 to about 20% by weight, preferably 1 to 10% by weight and particularly preferably 2 to 8% by weight, based on the printing ink.

In the case where the security element according to the invention is also intended to comprise flake-form effect pigments and/or organic or inorganic coloured pigments, these are present in the printing ink in accordance with the present invention in a concentration of about 0.01 to about 40% by weight, preferably 2 to 20% by weight and particularly preferably 5 to 15% by weight, based on the printing ink.

The said pigments and particles can be added to the printing ink individually or in a mixture. This can take place in the form of the pulverulent pigments and particles. However, the above-mentioned pigments and particles are preferably introduced into the printing ink according to the invention individually or in a mixture of at least two different types thereof in the form of flowable pigment compositions or dry preparations. Besides the pigment constituents, these also comprise at least one suitable binder. Thus, for example, a pigment composition or a dry preparation can be prepared from a mixture of a particulate substance having electroluminescent properties and a transparent, electrically conductive pigment, with which one or more effect and/or coloured pigments are optionally also admixed. Individual compositions or other combinations are likewise possible. Flowable pigment compositions are taken to mean, in particular, pastes or slurries, which, besides the said pigments, may also comprise binders, solvents and optionally one or more additives. The said dry preparations generally comprise the same additives, but with a very substantially reduced solvent content. However, preparations which comprise 0 to 8% by weight, preferably 2 to 8% by weight and in particular 3 to 6% by weight, of water and/or a solvent or solvent mixture are also regarded as dry preparations. These dry preparations are preferably in the form of pearlets, briquettes, pellets, granules, chips, sausages or in similar forms and generally have particle sizes of about 0.2-80 mm. Flowable pigment compositions and dry preparations of this type simplify the transport, storage and uniform introduction of the pigments into the printing ink, prevent separation of pigments and further constituents and promote good redispersion behaviour of the printing inks.

Besides the pigment constituents, the printing ink according to the invention comprises one or more suitable binders and optionally further additives, such as solvents, adhesion promoters, dispersion aids, drying accelerators, photoinitiators and the like, which are customary in printing inks. It goes without saying that these binders and additives are matched to the printing process to be used and that the printing ink has an appropriate viscosity. It should be ensured here that only binders and additives which essentially do not increase the electrical conductivity in the security element produced using the printing ink are selected, so that the formation of continuous conductivity in the security element is prevented. The concentration of the transparent, electrically conductive pigment can also be selected within the above-mentioned limits in such a way that continuous conductivity does not arise in the security element.

Suitable printing processes are in principle all printing processes which are known and customary in the production of security products, such as, for example, offset printing, letterset printing, offset coating, flexographic printing, screen printing, thermal sublimation printing, gravure printing, in particular halftone photogravure printing and recess printing, the overprint varnish process, and all contactless printing processes. However, the printing ink according to the invention is particularly preferably used in the screen printing process.

However, it is also possible to employ other coating methods, such as, for example, knife coating, brushing, stamping, pouring methods, lacquering methods, flow methods, roller or grid application methods or application by means of air brush.

The security element in accordance with the present invention can also be in the form of a polymeric layer which is present on or in a security product over the entire surface or in a part-area.

A further preferred embodiment of the invention is therefore a polymeric layer which represents the security element according to the invention and is located on or in a security product.

This polymeric layer comprises at least one particulate substance having electroluminescent properties and a transparent, electrically conductive pigment. In a preferred embodiment, the polymeric layer additionally comprises at least one flake-form effect pigment and/or at least one organic or inorganic coloured pigment.

The polymeric layer can be, for example, a film laminated or stuck to a security product over the entire surface or, for example, a film coextruded with other polymer films (with or without security elements). Also suitable are rigid sheets of polymeric materials which comprise both transparent, electrically conductive pigments and also particulate electroluminescent substances and are bonded in a conventional manner, for example by adhesive bonding, to other layer materials, optionally carrying information. These films or sheets can be located either on the surface of a security product or alternatively in an interlayer which is surrounded on both sides by other polymer layers. However, they can also form per se the base, i.e. the support material of a security product.

The thickness of the polymer layers, the polymeric material, the flexibility and the type of bonding of these layers to other layers of the security element are not restrictive here so long as the electroluminescent feature is machine-readable and can clearly be recognised and evaluated due to colour and/or gloss effects produced by flake-form effect pigments or inorganic and/or organic coloured pigments optionally furthermore added.

The polymeric layer may likewise be applied to part of a document of value or introduced into the latter. In this case, as in the case of printing, any conceivable form is suitable so long as the electroluminescence and any additional colour and gloss effects are still clearly evident or machine-readable. All forms already mentioned for printing are suitable. Preference is given here to the application or introduction of a polymeric layer in the form of a strip to or into a document of value. If the polymeric layer is applied to an article of daily need to be safeguarded, it is for practical and aesthetic reasons preferably likewise present on part of the surface thereof.

The type of application or introduction to or into part of the security product should not be regarded as restrictive. For example, adhesive bonding, lamination or other common types of bonding to other materials which are customary for polymeric layer materials may be mentioned here.

The other layer materials preferably consist of papers of various types or polymeric materials, but may also be textile materials or metals, etc.

If the security element according to the invention consists of a polymeric layer, the security element in the form of the polymeric layer has two surfaces essentially parallel to one another and comprises in the polymeric layer at least one particulate substance having electroluminescent properties, a transparent, electrically conductive pigment and at least one polymer.

The concentration of the particulate substance having electroluminescent properties in the polymeric plastic is about 0.05 to 15% by weight, preferably 0.2 to 10% by weight and particularly preferably 1 to 8% by weight, based on the plastic. By contrast, the transparent, electrically conductive pigment is generally present in a concentration of about 0.01 to about 30% by weight, preferably 0.2 to 15% by weight and particularly preferably 1 to 8% by weight, based on the plastic.

In the case where the security element according to the invention is also intended to comprise flake-form effect pigments and/or organic or inorganic coloured pigments, these are present in the polymeric layer in a concentration of about 0.01 to about 40% by weight, preferably 0.1 to 20% by weight and particularly preferably 1 to 10% by weight, based on the plastic.

The pigments and particles are preferably introduced into the polymeric base composition in the form of masterbatches. Besides the pigment constituents, these also comprise suitable amounts of binders, solvents and optionally further customary auxiliaries and additives.

Polymers which can be employed here are all thermoplastics which exhibit an inert behaviour to the electroluminescent substances and the transparent, electrically conductive, flake-form effect pigments. In particular, the polymers must not be electrically conductive or increase the electrical conductivity of the polymeric layer. In particular, it must be ensured that the polymeric layer as such is not continuously electrically conductive although it comprises electrically conductive pigments.

The polymeric layer is preferably transparent. Preference is therefore given to the use of transparent polymers. This applies, for example, to polystyrene, polyvinyl chloride and copolymers and graft polymers thereof, polyvinylidene chloride and fluoride, polyamides, polyolefins, polyacrylates and polyvinyl esters, thermoplastic polyurethanes, cellulose esters and the like. They can be employed individually or in suitable mixtures.

In addition, the polymeric layer may additionally comprise customary auxiliaries and additives, such as fillers, UV stabilisers, inhibitors, flameproofing agents, lubricants, plasticisers, solvents, dispersants and additional dyes or organic and/or inorganic coloured pigments.

The polymeric layers are preferably produced by various suitable methods, such as film casting, spinning, extrusion methods, calendering or pressing methods, but in particular by extrusion methods or via a film blowing method. To this end, the various starting materials are mixed with one another and converted into polymer layers in the form of films of various thickness or thin sheets in suitable, generally known equipment. The flake-form pigments (effect pigments and optionally also the electrically conductive pigments) present in the polymer composition are aligned here at the surfaces of the moulds and are therefore aligned essential parallel to the surfaces of the polymeric layer in the resultant polymeric layers. Stretching and tension operations during film blowing or as working steps after extrusion additionally augment this alignment of the pigments.

This alignment is fixed during subsequent cooling.

Separation or settling behaviour of the pigment mixture employed is not observed in the polymeric layers.

However, it must be ensured that excessive shear forces do not act on the pigment constituents in order to prevent destruction thereof.

Instead of into a polymeric material, the electroluminescent particulate substances and the transparent, electrically conductive pigments can also be introduced into papermaking stocks or textile raw material mixtures.

A security element of this type is produced by adding, in addition to the said constituents, all base materials and auxiliaries which are customary, in particular, in papermaking. Changes in the usual process procedure do not arise due to the particulate substances and pigments. Instead, their concentration is selected so that all standard methods, for example in papermaking, can be used. These are known to the person skilled in the art and therefore need not be explained in greater detail here. However, it must be ensured, as already described above, that the pigments are not damaged or destroyed in the paper and textile production process and that continuous electrical conductivity does not arise in the resultant paper or textile.

A security element of this type can be employed as support material or substrate for a security product. However, it can also be attached to pigmented or unpigmented substrate materials of a different or the same type.

The present invention additionally relates to a security product which comprises a single- or multilayered support material and at least one machine-readable security element arranged on or within a layer of the support material, where the security element comprises at least one particulate substance having electroluminescent properties and a transparent, electrically conductive pigment.

Optionally, but preferably, the machine-readable security element comprises at least one flake-form effect pigment and/or at least one organic or inorganic coloured pigment.

Suitable as support material for the security product according to the invention are all customary types of paper, but in particular security papers having unit weights of up to 200 g/m$^2$, preferably those made from cotton fibres, textile materials, polymeric materials, in particular polymeric layered materials, and films of all types, as well as coated or uncoated metal plates, metal foils and the like.

Preference is given to the use of security papers or polymer films.

The security product according to the invention is based on a single- or multilayered support material of the above-mentioned type, where the individual layers may consist of identical or different materials.

The security element is arranged in or on one of these layers.

If the security element according to the invention is arranged on a layer of the support material, it is then either applied over an entire surface or to part thereof.

If it is in the form of a single security element in a security product, it is preferably applied thereto over an entire surface. These are preferably security products having a relatively low security standard, such as, for example, packaging materials, labels, seals, entry tickets and the like. However, application over an entire surface should also be considered if the security element according to the invention is present as the only security element on one side of the security product.

In the case of security products having a high security standard, such as, for example, banknotes, however, a plurality of different security elements are generally present alongside one another on each side of the security product. In this case, partial coating with the security element according to the invention comes into consideration. The security element here is applied to the security product in various, unrestricted forms, for example as strips, dots, lines, alphanumeric symbols, pictorial representations, etc. This shaping is restricted merely by the application method and the machine readability of the electroluminescence or the optical perceptibility of the effect produced by the effect and/or coloured pigments. A sufficiently large area of the security product should therefore be coated with the security element according to the invention in order that all security levels of the security element can be clearly recognised by the viewer or clearly evaluated by machine.

If the security product is an article of daily use, such as, for example, clothing, shoes, household articles and the like, partial coating, which is not limited in shape and size and can advantageously be included in the optical design of the articles of daily use, is likewise obvious for practical reasons.

If the security element according to the invention is produced in a printing process, it naturally comprises the above-mentioned pigment constituents in a higher concentration than indicated for the printing ink since the solvent content is minimised after drying of the printing ink.

An enhancement of the desired effects, such as optical variability or optically visible colouring and electroluminescence properties, can be achieved if the pigment concentration in the security product according to the invention is increased by applying the printing ink a number of times one on top of the other. In this case, it is possible for the different print layers to comprise pigments from in each case all or only some of the above-mentioned three groups.

Thus, multiple application of printing inks which comprise a transparent, electrically conductive, flake-form pigment enhances the electroluminescence properties of the security element.

The coloured and/or preferably optically variable properties of the security element can be influenced by applying a plurality of layers comprising coloured pigments, effect pigments or preferably optically variable pigments one on top of the other. In this case, it is only necessary for at least one layer to comprise both a particulate substance having electroluminescent properties and also a transparent, electrically conductive pigment.

Thus, for example, it is advantageous for a layer of this type which, besides the particulate substance having electroluminescent properties and the transparent, electrically conductive pigment, also comprises a transparent effect pigment to be applied to a layer which comprises a semitransparent or opaque effect pigment. It is also possible for a layer comprising a transparent effect pigment to be applied to a layer which, besides the particulate substance having electroluminescent properties and the transparent, electrically conductive pigment, comprises a transparent or alternatively an opaque effect pigment. In both cases, interesting additional colour effects or enhancements of the original colour and/or gloss effect can be achieved.

The same potential variations are of course also possible if the security element according to the invention is in the form of a polymeric layer which can either be bonded to other polymeric layers or alternatively overprinted and/or underprinted.

If a plurality of pigment-containing layers are applied one on top of the other, where at least one layer comprises the security element according to the invention, the underlying and/or overlying layer can have the same or a different shape to the security element according to the invention.

This gives rise to large potential variations, in particular with respect to the optically perceptible shape and colour design. For example, an opaque, coloured and optionally optically variable background applied over the entire surface is possible, which the security element according to the invention in a certain shape emphasises. It is likewise possible for at least two layers lying one on top of the other-to have the same shape and be arranged precisely one above the other, so that an enhancement of the optical effect is only visible at this point.

In the security element in accordance with the present invention, the said pigment constituents are in a random distribution.

In descriptive form, the arrangement of the pigments can be described as a roof tile-like structure of the flake-form, transparent, electrically conductive pigments preferably employed with particles having electroluminescent properties arranged in a scattered manner in between. If flake-form effect pigments are additionally employed, most thereof, likewise coloured pigments and binders and polymeric base compositions, have dielectric properties.

For the machine readability of the electroluminescence, it is necessary for the luminous intensity of the particles to be sufficiently high to be registered and unambiguously assigned by the reader.

It is clearly evident that, due to the roof tile-like arrangement of the various flake-form pigments, it is not ensured that all electroluminescent particles are on the surface of the security element. Instead, many of them are hidden by the flake-form pigments. However, an increase in the concentration of the electroluminescent particles would be accompanied by processing disadvantages.

The transparency of the electrically conductive pigments also enables underlying electroluminescent particles to be seen if they have a sufficiently high luminescence intensity. It has also proven to be particularly advantageous for both transparent or at least semitransparent flake-form effect pigments and also transparent, electrically conductive flake-form pigments to be employed. These do not hinder the view of the electroluminescent pigments lying under them.

In order to be able to detect the electroluminescence in the security element according to the invention by machine, the security product which has the security element is introduced into an electric alternating field.

In principle, the arrangements and checking equipment described in DE 197 58 587 C2 are suitable for measurement of the electroluminescence in the security element according to the invention.

The field lines of the electric alternating field penetrate through the security element according to the invention and are deflected by the transparent, flake-form, electrically conductive pigments, so that partial amplification of the electric field occurs. The electromagnetic waves amplified in this way result in increased excitation of the particles having electroluminescent properties and provoke increased emission of luminescence radiation there, which can be unambiguously registered and assigned by the measuring instrument.

In principle, an amplification of this type of the luminescence radiation would also be achievable with non-transparent, electrically conductive pigments, for example with metal pigments or pigments which comprise metal layers. However, their opacity to light inevitably results in high pigment concentrations with respect to the electroluminescent particles having to be employed, since particles lying under the non-transparent pigments are completely covered. Such high pigment concentrations are disadvantageous.

In addition, combinations with coloured underprints, as described above, are not possible on use of opaque, electrically conductive pigments.

It has furthermore been found that security elements produced with opaque, electrically conductive pigments, in particular those having metal layers, lose their electrical conductivity on subsequent mechanical stressing of the security product, whether by printing plates or in particular by conventional subsequent embossing printing processes, although their optical properties which may also be present are retained. The electroluminescence in the security element is consequently then no longer sufficient to be unambiguously machine-readable.

It was therefore extremely surprising that a combination of electrically conductive, non-transparent pigments, in particular those having metal layers, which in this case are employed as effect pigments, with transparent, electrically conductive pigments and electroluminescent particles in accordance with the present invention results in security elements which have both the optical properties of metallic effect pigments and also a sufficiently high machine-readable electroluminescence, even when they are subjected to subsequent mechanical stresses, for example during an embossing printing process.

This is therefore a further preferred embodiment of the present invention.

The security element in accordance with the present invention has a number of advantages compared with the known solutions of the prior art. Since contactless machine detection of electroluminescent radiation is often unsuccessful on sole use of suitable amounts of electroluminescent materials in security elements, and security elements having integrated electrodes have a complicated structure, it is a major advantage of the present invention to have solved the problem of contactless measurement of electroluminescence by addition of a single further material. At the same time, it has been observed that the machine checking of the security element according to the invention takes less time than the checking of other security elements, meaning that it can readily be integrated into the existing checking process, for example of banknotes.

In order to achieve the object according to the invention, it is sufficient merely to add two different particulate materials in suitable amounts, for example to a printing ink, so that the security element in accordance with the present invention also has a simple structure, which can be achieved in the simplest case via printing onto a customary substrate. Polymeric layers which represent the security element according to the invention have a similarly simple structure.

Both prints and also polymeric layers can, due to their transparency, be combined extremely well with visible, in particular coloured, overlying or underlying layers. At the same time or alternatively, however, the security element according to the invention may itself also comprise effect and/or coloured pigments, which may themselves represent a security feature which can be detected optically without aids.

Since many electroluminescent substances also have photoluminescent properties, this can, if necessary, result in integration of a further security level, which can be verified, for example, using a UV lamp.

The security element in accordance with the present invention therefore represents an excellent way of being able to combine a plurality of security features belonging to different security levels with one another at a single point of a security product in addition to contactless machine readability of electroluminescent properties.

The counterfeiting security of security products is thus greatly increased.

The invention claimed is:

1. A machine-readable security element for security products, comprising
at least one particulate substance having electroluminescent properties and a transparent, electrically conductive pigment, wherein at least one layer of the security element comprises said at least one particulate substance having electroluminescent properties and said transparent, electrically conductive pigment, in which said transparent, electrically conductive pigment and said at least one particulate substance having electroluminescent properties are in a random distribution, and
wherein the concentration of transparent, electrically conductive pigment is such that the formation of continuous conductivity in the security element is prevented.

2. The security element according to claim 1, further comprising at least one flake-form effect pigment and/or at least one organic or inorganic colored pigment.

3. The security element according to claim 1, wherein said at least one particulate substance having electroluminescent properties comprises
inorganic compounds from groups II and VI of the Periodic Table which have been doped or activated with Cu, Mn or Ag;
silicates, aluminates, phosphates, tungstates, germanates and borates activated using Mn, Sr or rare earths; or
EL phosphor pastes, organic polymers or mixtures thereof, which emit visible radiation through excitation in an electromagnetic alternating field.

4. The security element according to claim 1, wherein said particulate substance having electroluminescent properties comprises microencapsulated particles.

5. The security element according to claim 1, wherein said transparent, electrically conductive pigment has at least one transparent, electrically conductive layer.

6. The security element according to claim 5, wherein said transparent, electrically conductive layer is located on a substrate selected from the group consisting of $TiO_2$, synthetic mica, natural mica, phyllosilicates other than synthetic mica or natural mica, glass, $SiO_2$, and $Al_2O_3$.

7. The security element according to claim 1, wherein said transparent, electrically conductive pigment is a mica pigment coated with at least one electrically conductive metal-oxide layer.

8. The security element according to claim 6, wherein said transparent, electrically conductive layer is a layer of Sb-doped tin oxide.

9. The security element according to claim 6, wherein at least one further, dielectric layer is located on said transparent, electrically conductive layer.

10. The security element according to claim 1, wherein said transparent, electrically conductive pigment is in flake form and has an aspect ratio of at least 2:1, and an average particle diameter of 1-500 μm.

11. The security element according to claim 1, wherein said transparent, electrically conductive pigment has a number-weighted mean particle area F50 of greater than or equal to 150 μm$^2$.

12. The security element according to claim 2, wherein said flake-form effect pigment is a pearlescent pigment, a transparent interference pigment, a semitransparent interference pigment, a metal-effect pigment, a liquid-crystal pigment, a structured polymer flake, or a mixture thereof.

13. The security element according to claim 2, wherein said flake-form effect pigment comprises an inorganic flake-form support having at least one coating of a metal, metal oxide, metal oxide hydrate, or mixtures thereof, a metal mixed oxide, suboxide, oxynitride, metal fluoride, BiOCl, or a polymer.

14. The security element according to claim 2, further comprising a transparent flake-form effect pigment.

15. The security element according to claim 2, further comprising a metal-effect pigment having at least one metal layer as flake-form effect pigment.

16. The security element according to claim 2, wherein said flake-form effect pigment is optically variable.

17. The security element according to claim 1, which is applied over an entire surface of a security product, or to part of a security product.

18. The security element according to claim 17, which is printed onto said security product by means of a printing ink.

19. The security element according to claim 17, which is in the form of a polymeric layer on or in a security product.

20. A security product comprising the security element according to claim 1 as a support material for said security product, wherein said support material is a polymer, paper, or textile layer comprising said at least one particulate substance having electroluminescent properties and said transparent, electrically conductive pigment, in which said transparent, electrically conductive pigment and said at least one particulate substance having electroluminescent properties are in a random distribution.

21. The security element according to claim 1, which emits visible and machine-detectable radiation after contactless excitation in an electric alternating field.

22. The security element according to claim 1, which emits visible and machine-detectable radiation after mechanical stressing and after contactless excitation in an electric alternating field.

23. A security product comprising a single- or multilayered support material and at least one machine-readable security element according to claim 1 arranged on or within a layer of said single- or multilayered support material.

24. The security product according to claim 23, which comprises the machine-readable security element in the form of a full or partial surface coating.

25. The security product according to claim 24, wherein said full or partial surface coating is in the form of a print.

26. The security product according to claim 24, wherein said full or partial surface coating is in the form of a polymeric layer.

* * * * *